Aug. 13, 1929.    E. WILDHABER    1,724,241
MACHINE FOR PRODUCING CURVED TOOTH GEARS
Filed Dec. 23, 1925    6 Sheets-Sheet 1

Ernest Wildhaber
INVENTOR

ATTORNEY

Aug. 13, 1929.   E. WILDHABER   1,724,241
MACHINE FOR PRODUCING CURVED TOOTH GEARS
Filed Dec. 23, 1925   6 Sheets-Sheet 4
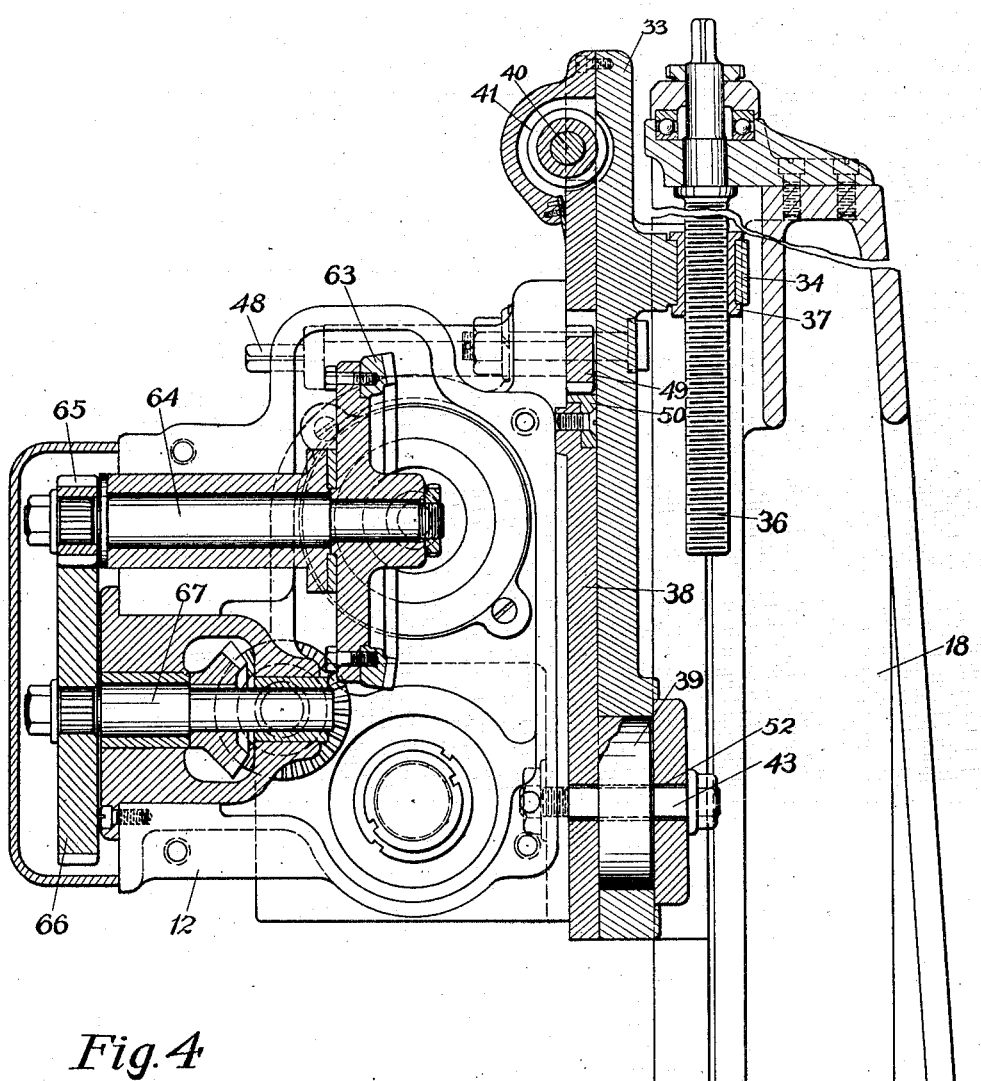
Fig. 4
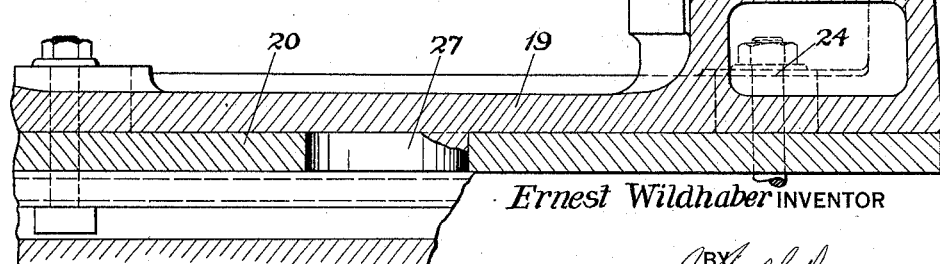
Ernest Wildhaber INVENTOR
BY
ATTORNEY

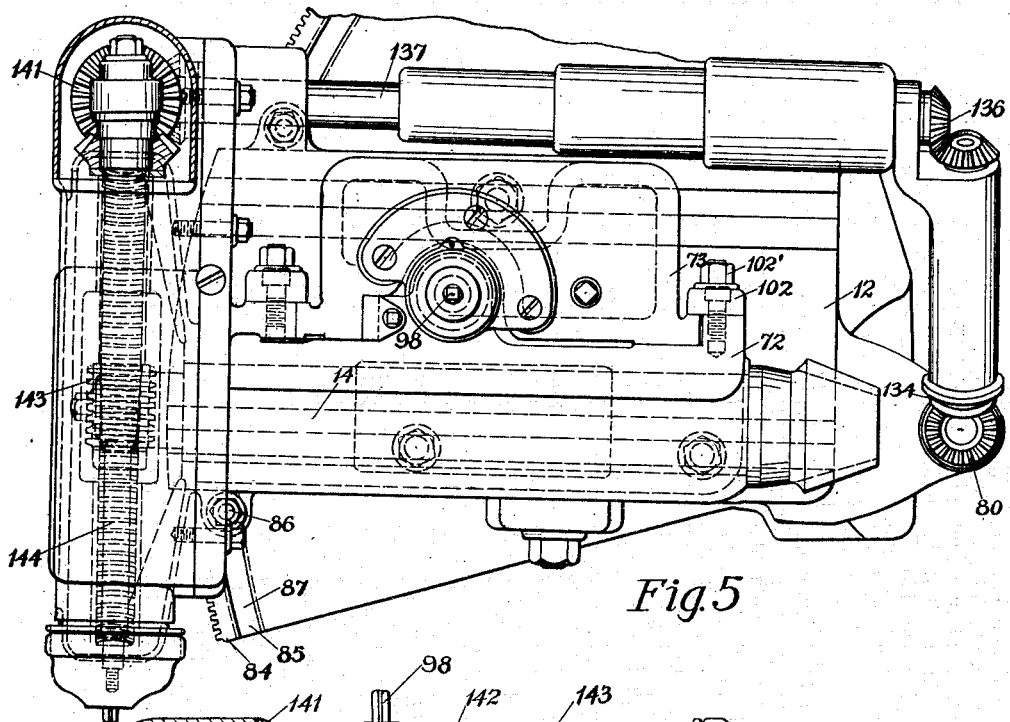
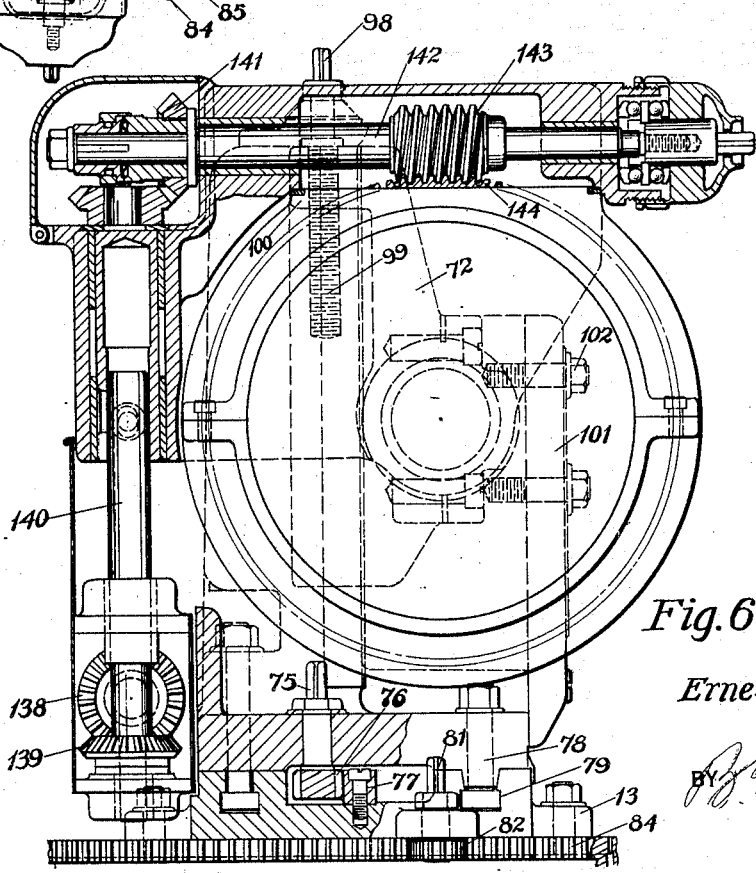

Aug. 13, 1929.  E. WILDHABER  1,724,241

MACHINE FOR PRODUCING CURVED TOOTH GEARS

Filed Dec. 23, 1925  6 Sheets-Sheet 6

Ernest Wildhaber INVENTOR

ATTORNEY

Patented Aug. 13, 1929.

1,724,241

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

MACHINE FOR PRODUCING CURVED-TOOTH GEARS.

Application filed December 23, 1925. Serial No. 77,310.

The present invention relates to a machine for producing gears and particularly to a machine for producing curved tooth gears.

One object of the present invention is to provide a machine for generating curved tooth hypoid or hyperboloidal gears.

A further object of this invention is to provide a machine on which curved tooth gears of different spiral angles and different dedendum angles may be cut with the same tool.

A still further object of the invention is to provide in a machine for producing gears a compact drive for the tool whereby the tool may be driven in any adjusted position.

Other objects will be apparent hereinafter from the specification and from the recital of the appended claims.

In the accompanying drawings, I have illustrated one embodiment of my invention. It will be understood, however, that the invention is not limited to the particular modification herein described, but is capable of further modification within the limits of the invention and the scope of the appended claims.

In the drawings:

Fig. 4 is a vertical sectional view taken at right angles to Fig. 2;

Fig. 5 is a plan view, with parts broken away, of the blank head;

Fig. 6 is a rear elevation, partly in section, of the blank head;

Fig. 8 is a section on the line 8—8 of Fig. 1;

Fig. 9 is an enlarged detail view showing the blank withdrawing cam and associated parts;

Fig. 10 is a detail sectional view showing the parts connecting this cam with the frame, taken on the line 10—10 of Fig. 9.

Figure 1:
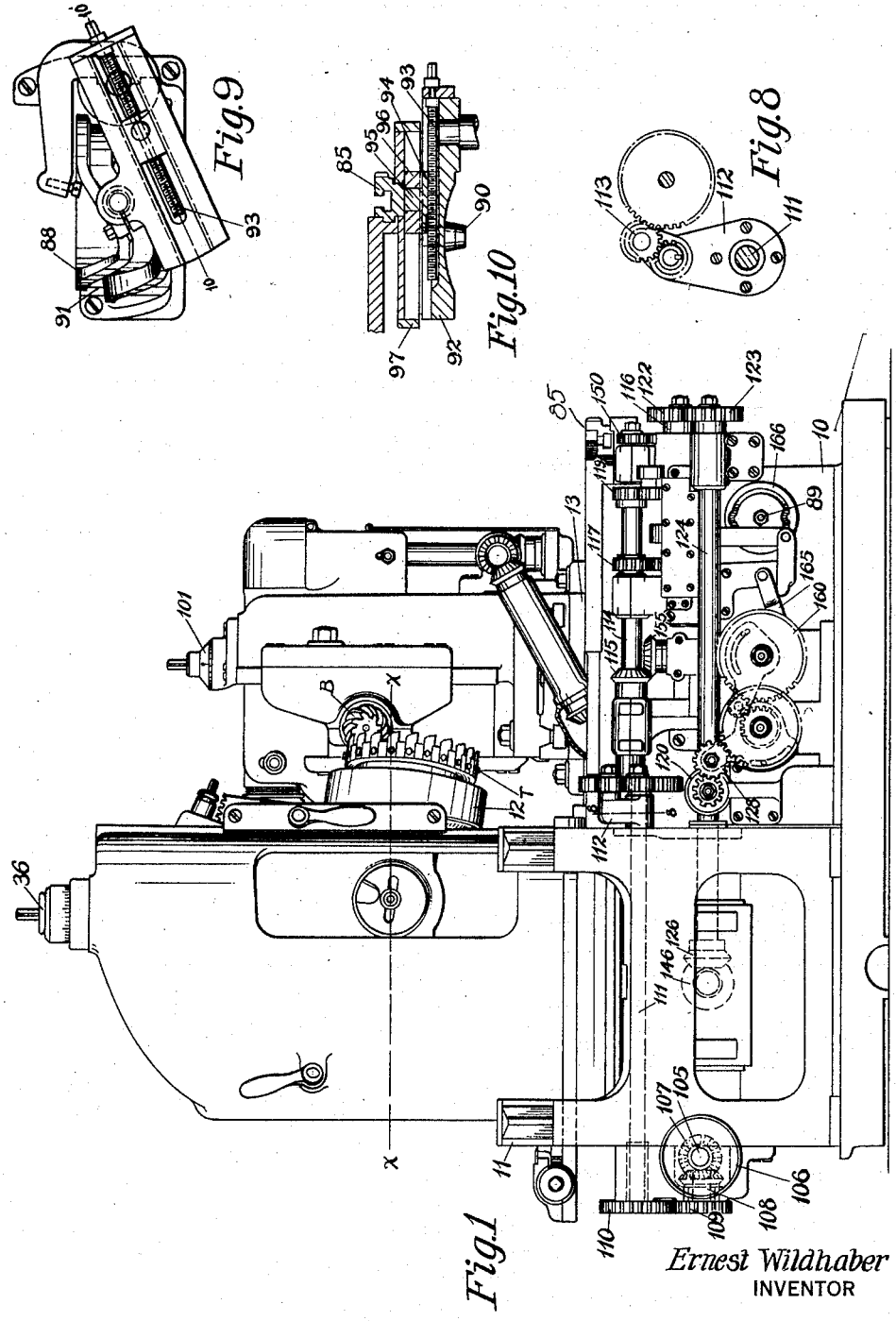
Fig. 1 is a side elevation of a machine constructed according to the preferred embodiment of my invention.

One feature of this invention is the provision of a machine for producing curved tooth generated hypoid gears. For this purpose means will be provided for moving the cutting tool in a curved path across the face of the gear blank and for simultaneously rolling the tool and blank relatively to each other in the manner of a gear meshing with another gear with its axis non-intersecting and non-parallel to the axis of said other gear. A machine constructed according to this invention, for the production of a generated hypoid gear will include, therefore, a tool support, a blank support, a cradle or carrier upon which one of these supports is mounted, means for positioning the blank with its axis offset from the axis of the cradle or carrier and means for imparting to the tool, blank, and cradle their respective motions, including means for indexing the blank.

A further feature of this invention is the provision of a machine for producing curved tooth tapered gears on which the tool and blank may be so positioned relatively to each other that one tool may be employed to cut all gears of the same pressure angle regardless of dedendum or spiral angle. This feature permits a very considerable reduction in the number of tools ordinarily required in producing curved tooth gears. With a machine constructed according to this invention, it is not necessary to substitute a different cutter for each different dedendum angle gear to be produced or to employ different cutters where gears having a wide range in spiral angle are to be cut. The present machine hence permits of a considerable saving in tool costs. This reduction in the number of tools required is effected in a machine constructed according to this invention by providing, in addition to the ordinary tool and blank adjustments, which permit of positioning the tool and blank in cutting engagement and of adjusting the tool relatively to the blank so as to cut different spiral angles and at different cone distances and to different depths, means for adjusting the tool and blank relatively to each other so as to vary the inclination of the tool and blank axes and their relative offset. These adjustments make it possible to vary the inclination of the tool axis to the blank axis and the inclination of the cutting edge of the tool to the side of the tooth to be cut, and by making these two adjustments, it is possible to employ the same tool to produce gears of different spiral and dedendum angles.

Referring to the drawings by numerals of reference: 10 indicates the base upon which is oscillatably mounted a cradle 11, carrying a tool support or housing 12. Pivotally mounted on this base 10 is a frame 13 upon which is supported the blank spindle 14 and the blank B carried thereby. Means are provided for positioning the tool and blank in operative relation, and means are provided for adjusting the tool axis to any desired inclination or offset relation with respect to the axis of the blank. For generating gears, means are provided for moving the tool, preferably, a rotary face mill in a curved path across the face of the blank while rotating the blank on its axis and simultaneously imparting a movement to the cradle about its axis. For generating hypoid gears, means are provided for offsetting the blank axis from the axis of the cradle, which represents the axis of the gear or basic element with which during the cutting operation the blank is theoretically rolling. In the machine shown, after the completion of each cutting operation, the tool and blank are withdrawn relatively to one another to permit of indexing the blank.

The tool T, a rotary face milling cutter provided with blades 15 of circular arc profile is mounted upon a spindle 16 which is suitably journaled in the housing 12. The housing 12 is so mounted on the cradle 11 as to permit of adjustment of the tool longitudinally of its axis or spindle to take up for wear on the cutting blades or to vary the depth of cut. It is also mounted for lateral adjustment preferably at right angles to the cradle axis so that the tool may be set any desired distance from the blank apex to cut gears of different cone distances and face width, and it is vertically adjustable so as to permit of positioning the tool for cutting gears of different spiral angles. These adjustments are usual in machines for cutting curved tooth gears and no invention is claimed for the particular means employed in the machine illustrated, whereby these adjustments may be attained. In addition to these usual adjustments, however, means are provided for inclining the tool axis to any desired angle relative to the blank axis and for tilting the tool axis any desired amount with reference to the tooth surface to be cut. These two adjustments, novel with the present invention, permit of cutting gears with any desired root angle and by a generating motion in which the blank may be rolled on a conical surface of any desired cone angle and they permit, in addition, of setting the tool in any desired angular and offset relation to the blank whereby the same tool may be employed to produce gears of various dedendum and spiral angles.

The means for securing these various adjustments may be of any suitable character. In the machine illustrated, the tool housing 12 is mounted upon an upright 18 which has formed integral with it a plate or foot portion 19 which is mounted on a horizontal slide 20 which is adjustable laterally on the cradle 11, for positioning the tool any desired distance from the cone apex of the blank whereby to cut gears of different face widths. The lateral adjustment of the slide 20 may be effected by rotation of a shaft 21 which is suitably journaled in the plate 19 and which carries at its inner end a pinion 22 which meshes with a rack 23 which is secured to the upper face of the cradle 11. The slide 20 may be secured in any adjusted position on the cradle by means of bolts 24 which engage in T-slots 25 formed in the cradle. One of the angular adjustments of the tool is secured by rotating the plate 19 about the axis of a lug or stud 27 which is formed integral with said plate and which is journaled in a suitable socket in the slide 20. This adjustment may be effected in any suitable manner as by rotating the shaft 28 which is journaled in suitable bearings in the slide 20 and which carries a worm 29 which meshes with a worm wheel segment 30 which is secured to the plate 19. An index pointer and scale, indicated generally at 31, may be employed for precision adjustment of the plate. The bolts 24, already referred to, serve also to maintain the plate in any position of its angular adjustment.

Mounted on the upright 18 for vertical adjustment thereon is a vertical slide 33 which is provided with a rearwardly extending portion 34 which is guided in a slot 35 formed in the upright. The vertical slide may be adjusted on the upright by means of a screw 36 which is journaled in the upright and which is threaded into a nut 37 which is seated in a suitable socket in the projecting portion 34 of the slide. The vertical slide may be secured in any adjusted position by the lugs or clamps 32 and bolts 32′. Mounted on this vertical slide 33 for angular adjustment thereon is a plate 38 which is provided with a rearwardly extending lug or stud 39 which is journaled in a suitable socket in the slide 33. The plate 38 can be adjusted about the axis of this lug or stud by rotating the shaft 40 which is suitably journaled in slide 33 and which carries a worm 41 which meshes with a worm wheel segment 42 which is secured to the plate. The plate 38 may be secured in any adjusted position on the slide 33 by means of bolts 43 which are engaged in slots 44 provided therefor, in the plate. The saddle or housing 12 is mounted on the plate 38 and is adjustable laterally thereon in a direction longitudinal of the cutter spindle 16 to permit of adjusting the tool to take up wear or of setting the tool to cut to different depths. This adjustment may be effected by rotating the shaft 48 which is journaled in the housing or saddle 12 and which carries at its inner end a pinion 49 which meshes with a rack 50 which is secured to the plate 38. The bolts 43, already referred to, pass through slots 51 formed in the cutter housing or saddle and serve to secure the saddle in any adjusted position. It should be noted that the lug or stud 39 is slotted as at 52 to permit of the lateral adjustment last referred to and of the functioning of the clamping bolt 43 which passes through this stud in any position of the saddle.

By adjusting the tool vertically on the upright 18, as by the adjustment of the slide 33, the tool axis or center of tooth curvature may be positioned in any desired relation to the blank, whereby gears of different spiral angles may be cut. This adjustment is usual in curved tooth cutting machines to permit the employment of different tools. The angular adjustment of the tool and plate 38, combined with the angular adjustment of the plate 19 permits of inclining the axis of the tool to any desired angle relative to the axis of the blank and so of offsetting the tool axis any desired amount from the axis of the blank while inclining the tool to produce a desired predetermined pressure angle on the blank. These two adjustments permit of employing the same tool to cut various gears of different dedendum and spiral angle and in a pair of gears in which one member is generated and the other non-generated, these two adjustments permit cutting of both members of the pair with the same tool. For precision adjustment an index pointer and scale, indicated generally at 54 may be provided so as to allow of accurate setting of the plate 38 on the slide 33.

The axes of the studs 27 and 39 will preferably intersect the axis of the tool spindle 16 and each other. Preferably also these two axes will intersect each other at right angles. This arrangement makes for ease and rapidity in calculating tool settings.

It should be noted that the adjustment of the plate 19 about the axis of the stud 27 permits of setting the tool axis at any desired angle to the blank axis, whereby gears of different root angles may be cut and whereby in generating gears it is possible to provide a rolling motion between the tool and blank in which the blank may be rolled on a conical surface of any desired cone angle, representing the pitch surface of a mating gear.

One feature of the machine illustrated is the means for driving the tool in any adjusted position. This drive includes a motor 60 which is built into the tool housing or saddle 12 and gearing housed wholly within the saddle for employing the power of the motor to rotate the tool. This gearing comprises a bevel gear 61, preferably a spiral bevel gear, which is mounted on the armature shaft 62 of the motor and which meshes with a bevel gear 63 which is keyed to the shaft 64 which is journaled in the saddle and which drives through a spur pinion 65 and a spur gear 66 the shaft 67 which is also journaled in the saddle and which carries one of a pair of miter gears 68, of which the mating member is keyed to the shaft 69 which is journaled in the saddle and which has secured to its inner end a spur pinion 70 which meshes with an internal gear 71 which is secured to the cutter head. This drive is simple and compact. It renders unnecessary the complicated drive which would otherwise have to be employed because of the various adjustments of the tool.

During the cutting motion, the blank is rotated on its axis and an oscillatory movement imparted to the cradle to produce the generated tooth profiles. The means for rotating the blank will be described next.

The blank spindle 14 is journaled in a bearing member 72 which is vertically adjustable on an upright 73 formed integral with the blank head 74. The blank head 74 is itself laterally adjustable on the frame 13 to permit of positioning the blank apex in correct relation to the axis X—X of the cradle. This last adjustment may be effected by rotating the shaft 75 which is journaled in the blank head and which carries a pinion 76 which meshes with a rack 77 which is secured to the frame. The blank head may be secured in any adjusted position by the bolts 78 which engage in T-slots 79 formed in the frame. The frame itself is angularly adjustable about the axis Y—Y of the gear 80 to permit positioning of the blank in the desired cutting plane. This adjustment may be effected in any suitable manner, for instance, by rotating the shaft 81 which is journaled in the blank head and which carries a pinion 82 which meshes with the circular rack 84 formed on a member 85 which is mounted on the base 10. The frame can be secured in any position of its angular adjustment by means of the T-bolts 86 which engage in circular T-slots 87 which are formed in the rack member 85. The rack member 85 which is formed concentric with the axis Y—Y of the gear 80 is connected in any suitable manner with a cam 88 (Figs. 9, 10 and 11) which is mounted for rotation on a shaft 89 which is journaled in the base 10. The connection shown includes a lug or projection 90 which engages in the cam groove 91 of the cam member and which is secured to an adjustable plate 92. This plate may be adjusted by means of a screw 93 and a block 94 with which is formed integral a stud 95 which seats in a block 96 which is slidable in a guide 97 secured to the rack member 85. The cam member 88 is provided for the purpose of periodically moving the rack member and frame about the axis Y—Y of the gear to periodically withdraw the blank from engagement with the tool to permit of indexing the blank. The cam groove 91 is so formed that while the cam member rotates continuously it holds the blank in engagement with the cutter for a sufficient period to permit the completion of one cutting operation and withdraws the blank for a period long enough to permit the latter to be indexed and it then returns the blank into engagement with the tool for cutting a new tooth surface or tooth surfaces of the blank.

The lateral adjustment of the blank head on the frame effected by rotation of the shaft 75 and pinion 76 and the angular adjustment of the frame on the rack member 85 accomplished by rotation of the shaft 81 and pinion 82 are usual adjustments in machines for producing gears from tapered blanks. Instead of the means shown for making these adjustments, any other suitable devices may be employed for the purpose.

The vertical adjustment of the blank spindle bearing member 72 on the blank head upright 73 is effected in the machine shown by rotation of the shaft 98 which is threaded as at 99 and engages a correspondingly threaded portion of the lug or projection 100 formed integral with the bearing member 72. A graduated dial 101 may be provided on the shaft 98 for accurate adjustment of the bearing member. The bearing member can be secured in any position of its adjustment by the clamping plates 101 which are secured to the upright 73 and which are forced into clamping engagement with the bearing member by the clamping bolts 102. This adjustment permits of moving the blank spindle bodily relative to the axis X—X of the cradle, or element with which the blank is rolling during the generation of the tooth profiles, to offset the blank axis any desired amount above or below the axis X—X of the cradle or, if desired, to position the blank with its axis intersecting the axis of the cradle. The present machine, therefore, provides means for positioning the blank so as to cut a gear in a rolling motion in which the blank axis is non-intersecting and non-parallel to the axis of the theoretical element with which it is rolled or to cut a gear in a rolling movement in which the axis of the blank intersects the axis of this theoretical basic element.

During the cutting motion of the tool, the blank is rotated on its axis and a rotary movement in one direction is imparted to the cradle 11. The means for rotating the blank will be described next.

Figure 7:
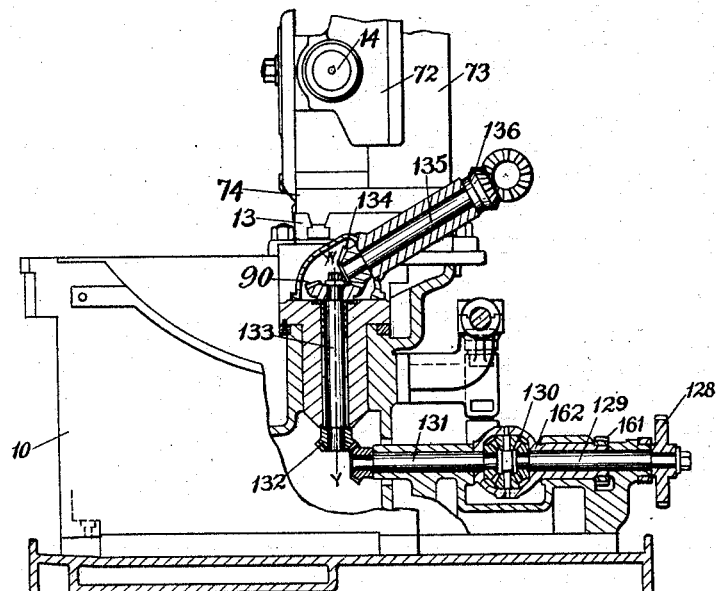
Fig. 7 is a front elevation, with parts broken away, showing the mounting and drive to the blank.

Journaled in the base 10 (Figs. 1 and 11) is a rotary shaft 105 adapted to be driven by a pulley 106 from any suitable source of power. This shaft 105 drives through the bevel gearing 107 a shaft 108 to which is keyed a spur pinion 109 which meshes with a spur gear 110 fastened to a shaft 111. This shaft 111 carries adjacent its inner end an arm 112 in which is journaled one of a set of change gears 113 which serve to transmit the rotation of the shaft 111 to a shaft 114 which is suitably journaled on the base. Keyed to this shaft 114 intermediate its length is a bevel gear 115 which serves to actuate the indexing mechanism for the blank as will presently be described. Journaled on the base 10 adjacent the shaft 114 is a reversible shaft 116 which is adapted to be driven from the shaft 114 by any suitable type of reversing mechanism, that shown being that more particularly described in U. S. patent to Gleason et al. No. 1,203,608, November 7, 1916. Reference may be had to the patent mentioned for more detailed description of such mechanism. It is sufficient to say here that the shaft 116 may be driven from the shaft 114 either through the spur gears 117 and 118 or through the spur gears 119 and 120 and the idler 121. Keyed to the shaft 116 adjacent its outer end is a spur gear 122 which meshes with a spur gear 123 which is secured to a shaft 124 which is journaled in suitable bearings on the base and which has keyed to it two bevel gears 125 and 126. The bevel gear 126 serves to actuate the cradle drive as will be described hereinafter. The bevel gear 125 meshes with a bevel gear 126 fastened to the shaft 127. This shaft 127 is suitably journaled in the base and carries at its outer end one of a set of change gears 128 which serve to transmit the rotation of the shaft 127 to a shaft 129 which is suitably journaled in the base (Fig. 7) and which is connected through differential gears 130 with a shaft 131. The shaft 131 drives through the miter gears 132 a shaft 133 coaxial with the axis Y—Y already referred to and carrying the gear 80, already referred to. The gear 80 meshes with a bevel gear 134 which is secured to the diagonal shaft 135 which is journaled in a suitable bearing on the base and which drives through the miter gears 136 the telescoping shaft 137 (Fig. 5). The shaft 137 has secured to its outer end a bevel gear 138 (Fig. 6) which meshes with a bevel gear 139 which is fastened to the lower end of a telescoping shaft 140, one section of which is journaled in the blank head 74 and the upper section of which is journaled in a suitable bearing formed integral with the bearing member 72. The telescoping shaft 140 transmits, through the miter gearing 141, rotation to the worm shaft 142 which is journaled in suitable bearing in the bearing member 72 and which carries a worm 143 which meshes with a worm wheel 144 which is secured to the blank spindle 14. The telescoping shaft 137 permits of transmission of power to the blank spindle in any position of its lateral adjustment, while the telescoping shaft 140 enables the blank spindle to be driven regardless of the position of the blank axis with reference to the axis X—X of the cradle. The means just described impart a rotary movement to the blank spindle and the blank carried thereby, during the cutting motion of the tool and the movement of the cradle, whereby the profiles of the teeth cut are generated.

Figure 2:
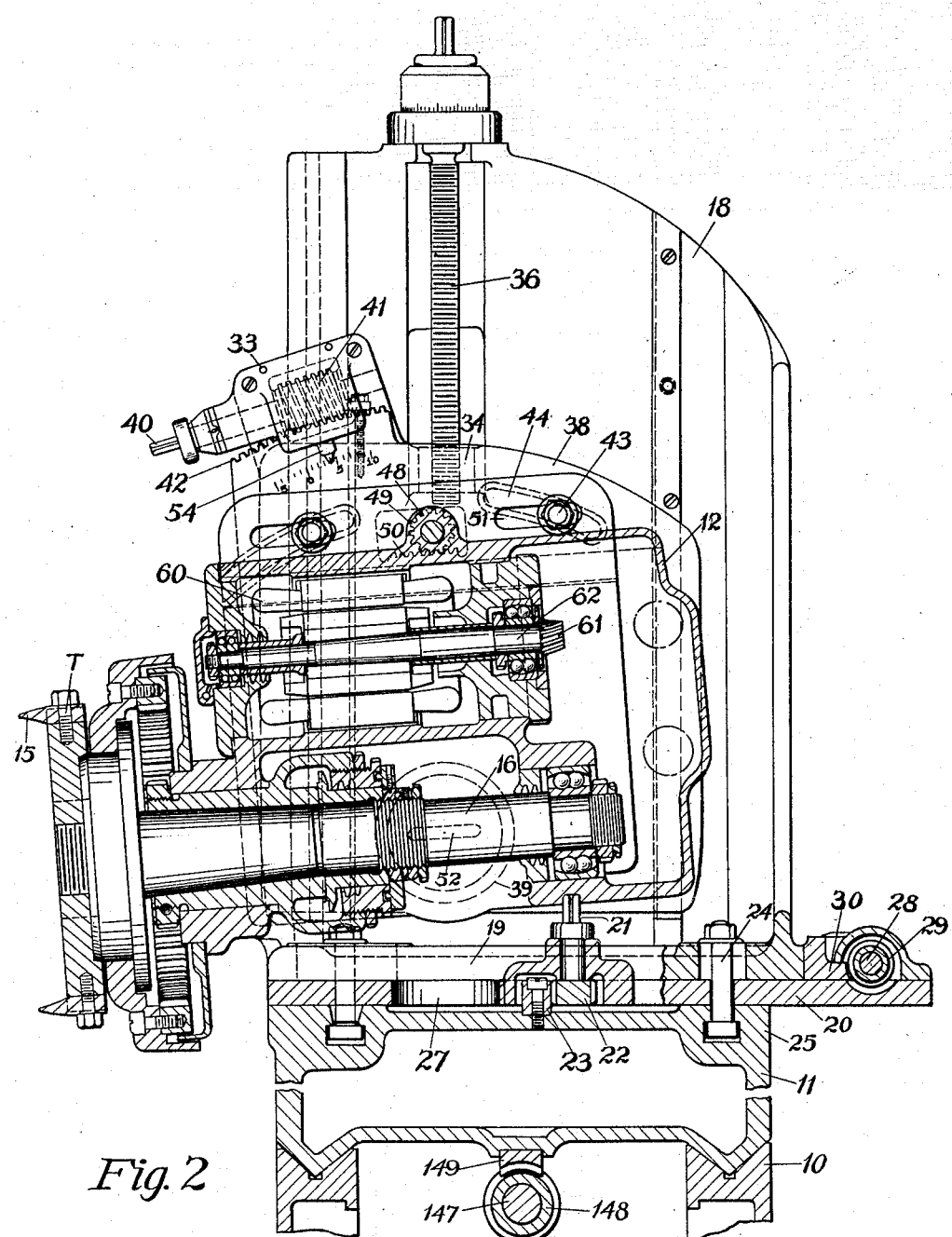
Fig. 2 is a vertical sectional view showing the mounting for the tool.
Figure 3:
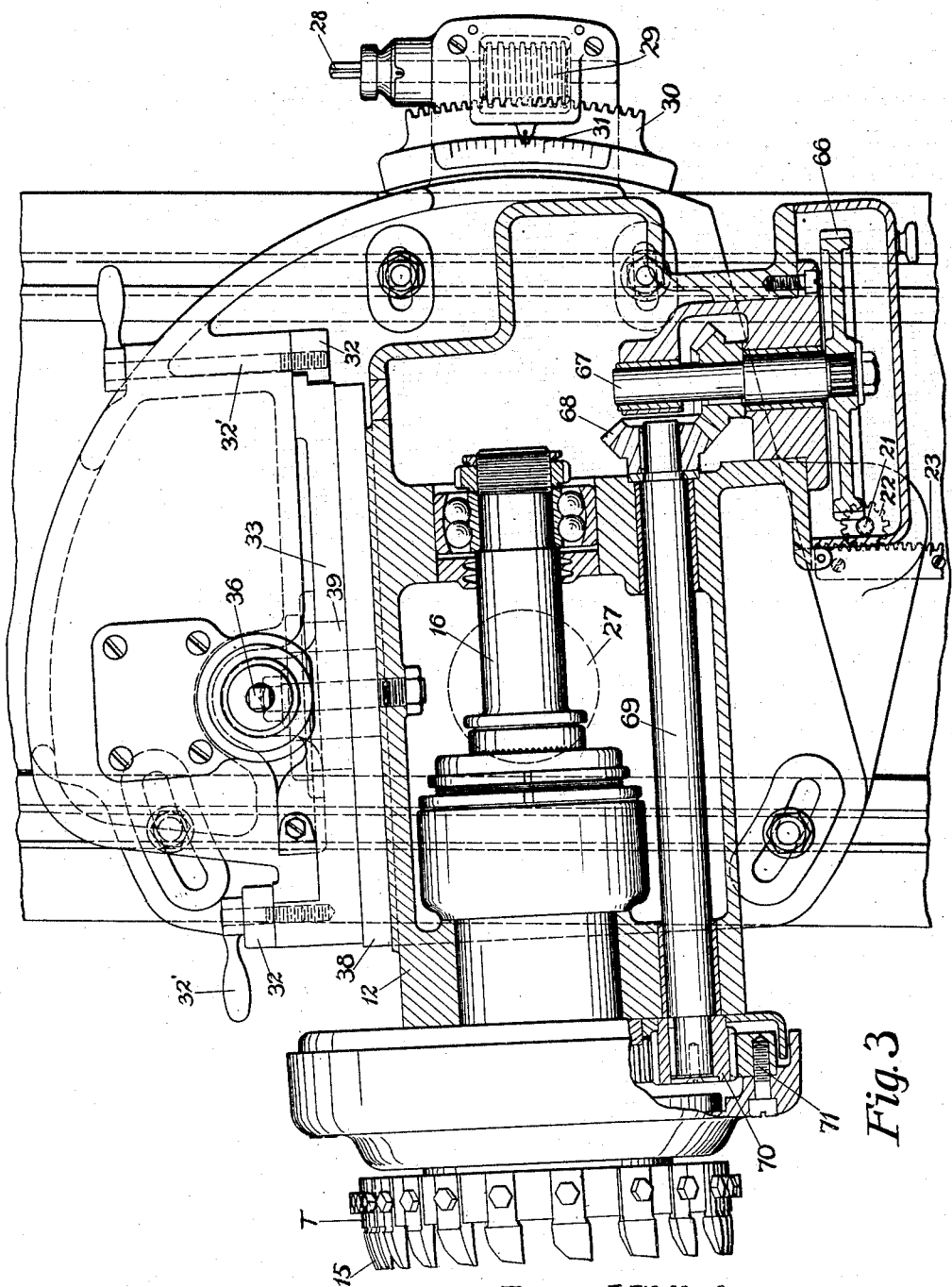
Fig. 3 is a plan view, partly in section, of the tool mounting.

The means for imparting to the cradle 11 its movement include the bevel gear 126, already referred to (Figs. 1 and 11), a bevel gear 146 which meshes with said bevel gear 126, a shaft 147 which is journaled in the base and to which is secured the bevel gear 146, a worm 148 secured to said shaft 147 (Fig. 2), and a worm wheel segment 149 which meshes with the worm 148 and which is secured to the cradle. By the means just described a movement is imparted first in one direction and then in the other direction, depending on the direction of rotation of the shaft 116, to move the cradle about its axis X—X. In the machine shown, the cradle movement is in one direction during cutting. It is reversed when the blank is withdrawn for indexing.

In the machine disclosed, the blank and tool are withdrawn relatively to each other, after one cutting operation has been completed, to permit of indexing the blank so as to present an uncut portion thereof to the tool on reengagement therewith. The means for effecting the relative withdrawal may be of any suitable character. In the present machine, this withdrawal is effected by the rotation of the cam 88, already referred to. The cam is continuously rotated in one direction from the shaft 114 by the change gears 150 (Figs. 1 and 11), one of which is secured to the shaft 114 and another of which is secured to a shaft 151 which is suitably journaled in the base and which carries a worm 152 which meshes with a worm wheel 153 which is keyed to the shaft 89, upon which the cam 88 is secured.

Figure 11:
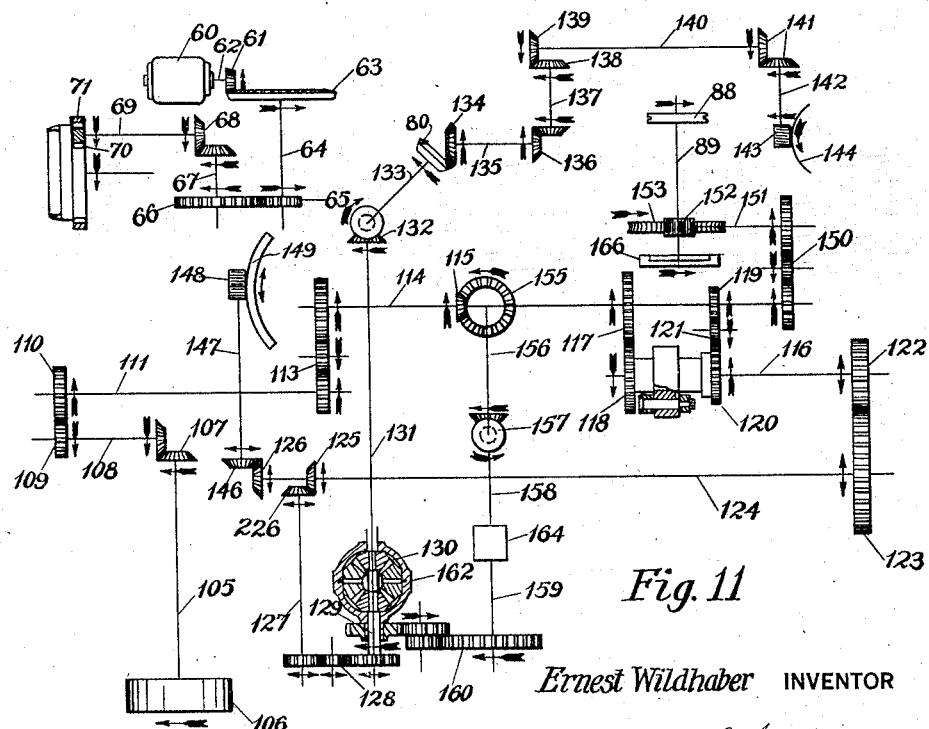
Fig. 11 is a diagrammatic view of the drive for the machine.

During the time the blank is withdrawn, it is indexed. In the machine shown, the indexing mechanism is constructed and operates as follows: The bevel gear 115, already referred to, meshes with a bevel gear 155 which is keyed to a shaft 156 which is suitably journaled in the base. This shaft 156 drives through a pair of miter gears 157 a shaft 158, which is connected by any suitable type of intermittent locking mechanism with a shaft 159. The shaft 159 carries adjacent its outer end one of a set of change gears 160 (Figs. 1 and 11) which serve to transmit the rotation of the shaft 159 to a spur gear 161 which is keyed to the differential housing 162, in which are mounted the differential gears 130, already referred to. By the means described, when the intermittent locking mechanism, indicated generally at 164 in Fig. 11, is released, an additional motion is imparted to the shaft 131 and thence to the blank spindle through the change gears 160 and rotation of the differential housing 162. This additional motion may increase or decrease the speed of rotation of the blank. In the machine shown, due to the reversal of movement of the cradle, when the blank is withdrawn, the indexing movement consists in a retardation of the rotation of the blank. The blank always rotates in the same direction, but due to this periodic retardation and the reversed movement of the cradle, it is intermittently indexed.

While I have described a particular mechanism for indexing the blank and for imparting to the blank its rotation during generation, it will be understood that I do not desire to limit my invention to the specific mechanism disclosed but that this invention may be practised through the employment of any suitable means for rotating the blank and indexing the same.

After the blank has been indexed, it is returned to position by the cam 88 for cutting a new tooth or tooth space. After the blank has been completely cut it may be withdrawn by any suitable mechanism.

The means for intermittently locking the shaft 159 may be of any suitable character. This mechanism forms no part of my invention. If desired the shaft 159 may be periodically released through actuation of the pawl 165 (Fig. 1) by rotation of the face cam member 166 which is driven by rotation of the cam shaft 89 and which may be mounted on this shaft as a separate element or as an integral part of the cam member 88.

In setting up the machine described for operation, the frame 13 will be adjusted about the axis Y—Y to position the blank in the proper cutting plane and the blank head will be adjusted laterally on the frame to position the blank apex in the desired relation to the axis X—X of the cradle. The blank spindle bearing member 72 will be adjusted on the head to position the blank axis in the desired relation to the cradle axis. For cutting one member of a pair of hypoid gears, this position will be above or below the cradle axis. The tool supporting slide 20 will be adjusted laterally on the cradle to position the tool axis the desired distance from the blank apex. The plate 19 will be angularly adjusted on the slide 20 to incline the tool axis at the desired angle to the blank axis. The tool will be adjusted vertically by rotation of the screw 36 for cutting the gear with the desired spiral angle. If any feed adjustment of the tool is necessary, this may be effected by rotation of the shaft 48. The additional angular adjustment by which the tool axis may be offset any desired amount from the blank axis and which combines with the angular adjustment of the plate 19 to permit the employment of a single tool for cutting various gears and for cutting theoretically accurate gears may be effected by rotation of the shaft 40. When the tool and blank have been adjusted into the desired relation, the machine is ready for operation.

By the "on-center" position of the machine, as this term is used in the claims, is meant that position of the machine where the various adjustable parts are in the zero or central position.

While the tool shown is provided with spherical cutting blades, it will be understood that the blades may be straight sided or of any desired curvature. Instead of a rotary face mill, moreover, a planing tool or other suitable tool may be employed, the planing tool being, of course, positioned so as to be swung about the same axis as that about which the face mill rotates. The present machine can also be used for grinding gears by substituting a suitable grinding wheel for the face mill shown. In general it may be said that while I have described my invention in connection with a specific structure, it is to be understood that the invention is capable of various further modifications and uses without departing from the intent of the invention or the scope of the following claims and that this application is intended to cover any adaptations or embodiments, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing tapered gears, a blank support, a tool, means for adjusting the tool angularly relative to the blank about two intersecting axes to vary, respectively, the inclination of the plane of the tip surface of the tool relative to the blank and the inclination of the cutting edge of the tool acting on the blank relative to the tooth surface being cut and means for moving the tool in a longitudinally curved path across the face of the blank.

2. In a machine for producing gears, a blank support, a rotary tool having an annular cutting portion movable in a longitudinally curved path across the face of the blank, means for adjusting the tool angularly relative to the blank about two intersecting axes, each of which in the on-center position of the machine is inclined to the axis of the tool and means for imparting to the tool a rotary motion.

3. In a machine for producing gears, a blank support, a tool, means for adjusting the tool angularly relative to the blank about two intersecting axes to vary, respectively, the inclination of the plane of the tip surface of the tool relative to the blank and the inclination of the cutting edge of the tool acting on the blank relative to the tooth surface being cut, means for moving the tool in a longitudinally curved path across the face of the blank and means for simultaneously imparting a relative rolling motion between tool and blank to generate the tooth profiles.

4. In a machine for producing gears, a blank support, a base, a rotary tool having an annular cutting portion mounted on said frame, means for adjusting said tool on the base in two planes at right angles to each other about axes which in the on-center position of the machine are inclined at right angles to each other and to the axis of the tool, and means for imparting a relative rolling motion between tool and blank to generate the tooth profiles.

5. In a machine for producing gears, a blank support, a rotary tool having an annular cutting portion movable in a longitudinally curved path across the face of the blank, means for adjusting the tool angularly relative to the blank about two intersecting axes, each of which in the on-center position of the machine is inclined to the axis of the tool, means for imparting a rotary motion to the tool and means for imparting a relative rolling motion between tool and blank to generate the tooth profiles.

6. In a machine for producing gears, a blank support, a rotary tool having an annular cutting portion movable in a longitudinally curved path across the face of the blank, means for adjusting the tool angularly relative to the blank about two intersecting axes, means for imparting a rotary movement to the tool and means for imparting a relative rolling motion between tool and blank in the manner of a gear meshing with a mating gear with its axis non-intersecting and non-parallel to the axis of said mate gear.

7. In a machine for producing gears, a frame, a blank support, a tool support, a cradle upon which one of said supports is mounted, movably mounted on the frame, means for adjusting tool on its support about two intersecting axes, each of which in the on-center position of the machine is inclined to the axis of the cradle, means for moving the tool in a longitudinally curved path across the face of the blank, means for rotating the blank on its axis and means for simultaneously moving the cradle on its axis.

8. In a machine for producing gears, a pivotal frame, a movable cradle, a blank support carried by one of said parts, a blank spindle journaled therein, a tool support carried by the other of said parts, a rotary tool journaled in said tool support and provided with an annular cutting portion, means for adjusting said tool support on its carrier about two intersecting axes, each of which in the on-center position of the machine is inclined to the axis of the cradle to vary the angle between the tool axis and the axis of the cradle, means for imparting a rotary movement to the tool, means for adjusting the blank support to move the blank spindle in planes parallel to itself, means for rotating the blank spindle on its axis and means for simultaneously moving the cradle on its axis.

9. In a machine for producing gears, a pivotal frame, a movable cradle, a blank support carried by one of said parts, a tool support carried by the other of said parts, a rotary tool journaled in said tool support, means for adjusting the tool support on its carrier to vary the angle between the tool axis and the axis of the cradle, means for adjusting the tool angularly in a plane at an angle to the plane of the first adjustment, means for imparting to the tool a rotary movement in any adjusted position, means for rotating the blank on its axis and means for simultaneously moving the cradle on its axis.

10. In a machine for producing curved tooth gears, a base, a pivotal blank support mounted on said base, an upright member angularly adjustable on said base, a saddle mounted on said upright member and angularly adjustable thereon in a plane at right angles to the plane of first adjustment, a tool mounted on said saddle and means for moving said tool in a longitudinally curved path across the face of the blank.

11. In a machine for producing longitudinally curved tooth gears, a blank support, a base, an upright member angularly adjustable on said base, a saddle mounted on the upright member and angularly adjustable thereon in a plane at right angles to the plane of the first adjustment, a rotary tool having an annular cutting portion journaled in said saddle and means for moving said tool in a curved path across the face of the blank.

12. In a machine for producing curved tooth gears, a blank support, a base, an upright member angularly adjustable on said base, to change the angle between the tool axis and blank axis, a saddle mounted on said upright member and angularly adjustable thereon in a plane at right angles to the plane of the first adjustment, a rotary tool, having a plurality of spherical cutting blades annularly arranged thereon, journalled in said saddle and means for rotating said tool on its axis.

13. In a machine for producing gears, a base, a blank support, a tool support, a cradle, upon which one of said supports is mounted, movably mounted on the base, means for adjusting the blank support to offset the axis of the blank from the axis of said cradle, means for adjusting the tool about two intersecting axes each of which in the on-center position of the machine is inclined to the axis of the cradle, means for moving the tool carried by said tool support in a longitudinally curved path across the face of the blank, means for rotating the blank on its axis and means for simultaneously moving the cradle on its axis.

14. In a machine for producing curved tooth gears, a base, a blank support, a tool support, a cradle upon which one of said supports is mounted, movably mounted on the base, a blank spindle journalled in said blank support with its axis offset from the axis of the cradle, a tool mounted on said tool support for movement in a longitudinally curvilinear path, means for adjusting said tool support so that the axis about which its curvilinear movement takes place is at an angle to the axis of the cradle, means for imparting to the tool its curvilinear movement, means for rotating the blank spindle on its axis and means for simultaneously moving the cradle on its axis.

15. In a machine for producing curved tooth gears, a base, a blank support, a tool support, a cradle upon which one of said supports is mounted, movably mounted on the base, a blank spindle journaled in said blank support with its axis offset from the axis of the cradle, a rotary tool, having an annular cutting portion, journaled in said tool support, with its axis at an angle to the axis of the cradle, means for rotating the tool and blank on their respective axes and means for simultaneously moving the cradle on its axis.

16. In a machine for producing curved tooth gears, a base, a blank support, a tool support, a cradle upon which one of said supports is mounted, movably mounted on the base, a blank carrier, a blank spindle journaled in said carrier, means for adjusting the blank carrier to move the blank spindle in planes parallel to itself, a rotary tool, having an annular cutting portion, journaled in said tool support, means for varying the angular relation between the axis of the tool and the axis of the cradle, means for rotating the tool and blank spindles on their respective axes and means for simultaneously moving the cradle on its axis.

17. In a machine for producing curved tooth gears, a blank support, a tool support, a cradle upon which one of said supports is mounted, an upright member angularly adjustable on said tool support about an axis at right angles to the axis of the cradle, a saddle mounted on an upright member and angularly adjustable thereon in a plane at right angles to the plane of the upright adjustment, a rotary tool provided with an annular cutting portion journaled in said saddle, means for imparting to said tool a movement in a longitudinally curved path across the face of the blank, means for rotating the blank on its axis and means for simultaneously imparting a rotary movement to the cradle.

18. In a machine for producing curved tooth gears, a blank support, a blank spindle journaled in said blank support, a tool support, a cradle upon which one of said supports is mounted, an upright member angularly adjustable on said tool support about an axis at right angles to the axis of the cradle, a saddle mounted on said upright member and angularly adjustable thereon in a plane at right angles to the plane of the first adjustment, a rotary tool provided with an annular cutting portion journaled in said saddle, means for adjusting the blank spindle bodily, relatively to the axis of said cradle, means for rotating the tool on its axis in any adjusted position, means for rotating the blank on its axis in any adjusted position and means for moving the cradle on its axis.

19. In a machine for producing curved tooth gears, a blank support, a tool support, a tool mounted on said support and movable in a curved path across the face of the blank, a cradle upon which one of said supports is mounted, means for adjusting the blank support to offset the axis of the blank from the axis of the cradle, means for imparting a rotary movement to the blank, a curvilinear movement to the tool and means for simultaneously moving the cradle on its axis.

20. In a machine for producing gears, a blank support, a tool support, a base, a cradle upon which one of said supports is mounted, movably mounted on the base, a rotary cutter, having an annular cutting portion movable in a longitudinally curved path across the face of the blank, mounted on said tool support, means for adjusting the blank support to offset the axis of the blank from the axis of the cradle, means for rotating the tool on its axis, means for rotating the blank on its axis and means for simultaneously moving the cradle on its axis.

21. In a machine for producing gears, a blank support, a tool support, a base, a cradle upon which one of said supports is mounted, movably mounted on the base, a rotary cutter provided with a plurality of spherical cutting blades movable in a longitudinally curved path across the face of the blank mounted on said tool support, means for adjusting the blank support to offset the axis of the blank from the axis of the cradle, means for rotating the tool on its axis, means for rotating the blank on its axis and means for simultaneously moving the cradle on its axis.

22. In a machine for producing gears, a blank support, a blank spindle journaled in said blank support, a base, a tool support, a tool, having an annular cutting portion, journaled in said tool support, a cradle upon which one of said supports is mounted, movably mounted on the base, means for adjusting the blank spindle on its support to offset the axis of the blank from the axis of said cradle, means for adjusting the tool support relative to the blank so that the axis of the tool is at an acute angle to the axis of the cradle, means for rotating the tool on its axis, means for rotating the blank on its axis and means for simultaneously moving the cradle on its axis.

23. In a machine for producing gears from conical blanks, a blank carrier, a base, a tool saddle adjustably mounted on said base, a tool spindle journaled in said saddle, a rotary tool having an annular cutting portion mounted on said spindle, and means for imparting a rotary motion to tool and spindle comprising a motor housed within said saddle and gearing also housed within said saddle connecting the armature shaft of said motor with said spindle.

24. In a machine for producing curved tooth gears, a blank support, a base, a tool support mounted on said base, means for adjusting the blank support angularly on the base, means for adjusting the tool and blank supports relatively to each other to position the tool in the desired relation to the cone apex of the blank, means for adjusting the tool about two axes intersecting each other to vary, respectively, the inclination of the plane of the tip surface of the tool relative to the axis of the blank and the inclination of the cutting edge of the tool acting on the blank relative to the tooth surface being cut and means for moving the tool in any adjusted position in a longitudinally curved path across the face of the blank.

25. In a machine for producing curved tooth gears, a frame, a movable cradle, a blank support carried by one of said parts, a blank spindle journaled therein, a tool support carried by the other of said parts, a tool journaled in said tool support, means for adjusting the tool support on its carrier to vary the angle between the tool axis and the axis of the cradle, means for adjusting the tool angularly in a plane at an angle to the first adjustment, means for adjusting the blank support bodily to move the blank spindle bodily in parallel planes, means for moving the tool in a longitudinally curved path across the face of the blank, means for rotating the blank spindle on its axis, and means for simultaneously moving the cradle on its axis.

26. In a machine for producing gears, a frame, a blank support, a tool support, a cradle upon which one of said supports is mounted, movably mounted on the frame, means for adjusting the tool on its support about two axes at right angles to each other and at right angles to the axis of the cradle in the on-center position of the machine, means for moving the tool in a longitudinally curved path across the face of the blank, means for rotating the blank on its axis and means for simultaneously moving the cradle on its axis.

27. In a machine for producing tapered gears, a blank support, a tool support, a rotary tool, provided with an annular cutting portion, mounted on said tool support, means for adjusting the tool angularly on its support about two intersecting axes, and means for rotating the tool on its axis in engagement with the blank.

28. In a machine for producing gears, a blank support, a blank spindle journaled therein, a tool support, a rotary tool provided with an annular cutting portion, mounted on said tool support, a cradle on which one of said supports is mounted, means for adjusting the tool angularly on its support about two intersecting axes, means for rotating the tool on its axis in engagement with the blank, and means for rotating the blank spindle on its axis and for simultaneously moving the cradle on its axis to generate the tooth profiles.

ERNEST WILDHABER.